US006401782B1

(12) United States Patent
Beaudry
(10) Patent No.: US 6,401,782 B1
(45) Date of Patent: Jun. 11, 2002

(54) LABEL LAMINATING DEVICE

(76) Inventor: Wallace J. Beaudry, N9330 County Hwy. H, Elkhart Lake, WI (US) 53020

(*) Notice: Subject to any disclaimer, the term of this patent is extended or adjusted under 35 U.S.C. 154(b) by 0 days.

(21) Appl. No.: 09/305,402

(22) Filed: May 5, 1999

Related U.S. Application Data

(60) Provisional application No. 60/084,036, filed on May 5, 1998.

(51) Int. Cl.[7] .......................... B32B 31/00; G05B 11/01

(52) U.S. Cl. ....................... 156/352; 156/353; 156/358; 156/368; 156/516; 156/248; 156/268; 283/70; 283/81; 283/101

(58) Field of Search ................................ 156/257, 267, 156/268, 270, 302, 249, 238, 511, 517, 248, 358, 368, 516, 352, 353; 283/70, 81, 101

(56) References Cited

U.S. PATENT DOCUMENTS 4,046,613 A * 9/1977 Kucheck et al. ............ 156/249
4,153,496 A * 5/1979 Swift ......................... 156/384
6,220,327 B1 * 4/2001 Rothwell et al. ........... 156/387

* cited by examiner

*Primary Examiner*—Linda Gray
(74) *Attorney, Agent, or Firm*—Ryan Kromholz & Manion, S.C.

(57) ABSTRACT

A device for laminating labels disposed upon a continuous strip of liner. The device includes a plurality of spindle structures for supplying a continuous strip of protective film and the continuous strip of liner to a laminating structure which adheres the continuous strip of protective film to the continuous strip of liner over the labels disposed thereon to form a single continuous strip of laminated liner. The laminating structure has a drive wheel with a plurality of teeth arranged upon the surface of the drive wheel so as to engage a plurality of tractor feed holes formed into the continuous strip of the laminated liner. The drive wheel rotates to bring the continuous strip of laminated liner into contact with a plurality of laminate cutting blades that rotate in registration with the drive wheel so as to cut the protective film in registration with the labels disposed upon the strip of liner.

6 Claims, 3 Drawing Sheets

LABEL LAMINATING DEVICE

Benefit of prior filed co-pending provisional application U.S. Ser. No. 60/084,036, filed May 5, 1998, is requested and is hereby claimed.

BACKGROUND OF THE INVENTION

The present invention is drawn to a device for laminating labels. More specifically the present invention is a laminating device for precisely and accurately placing a protective film over an existing label that is on a liner material.

Many manufacturers of diverse products desire to include product and manufacturer information upon their products. One method of including such information with a product is to include a pamphlet or other literature with the product. However, literature is very often misplaced, damaged or destroyed, thereby resulting in the loss of all the information that the manufacturer wished to include with the product.

Another more permanent method of including information with a product is to engrave it upon a metal plate which would then be affixed to the product with mechanical fasteners or with an adhesive. The drawback to using metal plates to carry information is that the cost of the plates themselves, and engraving them, are relatively high.

An alternative to the use of included literature and engraved plates is the adhesive label. Adhesive labels can come in many sizes and shapes, in a variety of colors and patterns, and readily receive printing as from a laser printer, resin printing process, or a thermostatic printer. Adhesive labels also have the advantage of being very inexpensive.

Labels can also be designed for use in a wide range of environments. For example, adhesive labels are now being used in place of engraved metal plates as engine labels. An adhesive label designed for use as an engine label must withstand extreme heat without peeling or burning. An adhesive engine label must also be able to withstand water, oil, gasoline, and other chemicals or liquids without peeling. Finally, as the information on engine labels is sometimes critical, the labels must be tamper resistant, i.e. the labels must be difficult to remove and must indicate, by tearing or other damage, that they have been tampered with.

Adhesive labels that are to be used in a high speed manufacturing setting such as on an engine assembly line must also be capable of being mass produced. This need has been met by adhering continuous sheets of a suitable label material to a continuous sheets of releasable liner material and passing the resulting combination through a standard stacked die cutting system to form the unlaminated labels. The stacked die cutting system cuts tractor feed holes through each edge of the liner, cuts the outlines of the labels into the face of the label material, and forms perforations, security cuts, and printer registration holes through the liner material and label material. The stacked die cutting systems used to make the unlaminated labels also peel away the excess label material, leaving only labels of the desired size and shape disposed on the liner material.

Because adhesive labels are being increasingly used in applications where the materials commonly used in fabricating adhesive labels will not withstand the environmental conditions, it is important to tailor the structure and materials of the adhesive label according to the demands of the situation. In addition to, for example, fabricating labels from substrates and adhesives that are resistant to heat and oils, a clear laminate that is also resistant to heat and oils may be laid over an adhesive label. Such a laminate will prevent chemicals and even ultraviolet light from degrading the substrate of the label, the adhesive, or the printing on the label.

The present invention is a device for applying a laminate to an adhesive label. The laminating device of the present invention is capable of quickly, precisely, and accurately applying laminates over a large number of shapes and sizes of labels. The laminating device of the present invention is also capable of die cutting the laminate layer to be applied over the label so that the edges of the laminate and the label evenly offset around the entire perimeter of the label.

SUMMARY OF THE INVENTION

The present invention is a device for laminating labels which are typically disposed on a continuous strip of a liner material in a predetermined arrangement. The strip of liner material has parallel edges that are provided with a plurality of tractor feed holes arranged in registration with the predetermined arrangement of the labels disposed upon the liner material. The device for laminating the labels comprises a motor mechanism mounted between a first frame plate structure and a second frame plate structure so that the first and second frame plate structures are spatially oriented in a substantially parallel planar relation to one another. A label supply spindle structure and a, label take-up spindle structure are mounted upon the first frame plate structure with the label supply spindle structure being arranged to receive a roll of unlaminated labels and the label take-up spindle structure being arranged to receive a roll for winding up the labels once they have been laminated. The label supply and take-up spindle structures each have coupled thereto a clutch mechanism for driving the respective spindle structures. The clutch mechanisms coupled to the label supply and take-up spindle structures derives its motive power from the motor mechanism.

A laminate supply spindle structure, a laminate liner take-up spindle structure and a laminate waste take-up spindle structure are also mounted upon the first frame plate structure. The protective film and the laminate liner material also have tractor feed holes formed therein. The laminate supply spindle structure is arranged to receive a roll of a protective film disposed upon a continuous strip of a laminate liner material, the laminate liner take-up spindle structure is arranged to receive a roll for winding up the strip of laminate liner material after the protective film has been removed therefrom, and the laminate waste take-up spindle structure is arranged to receive a roll for winding up the protective film not used in laminating the labels. In addition, the laminate supply spindle structure, laminate liner take-up spindle structure, and laminate waste take-up spindle structure each have coupled thereto a respective clutch mechanism. The clutch mechanisms coupled to the laminate supply, laminate liner, and laminate waste take-up spindle structures derive motive power from the motor mechanism.

A laminating structure is also mounted between the first frame plate structure and the second frame plate structure, the laminating structure operating to apply the protective film to the labels in registration with the predetermined arrangement of the labels upon the liner material. The laminating structure is also powered by the motor mechanism via a plurality of clutch mechanisms.

The spindle structures and laminating structure are controlled by a control mechanism that controls the lamination of the labels.

The laminating structure itself comprises an inner laminate stripping drum and an outer laminate stripping drum. The inner and outer laminate stripping drums are slidingly disposed within a first pair of parallel slots formed between the first and second frame plate structures such that the inner and outer laminate stripping drums are in contact with one another. The inner and outer laminate stripping drums each have respective clutch mechanisms coupled thereto for driving the inner and outer laminate stripping drums. As with the spindle structures, the respective clutch mechanism of the inner and outer laminate stripping drums derive motive power from the motor mechanism.

The inner and outer laminate stripping drums cooperate to draw the strip of protective film from the roll received upon the laminate supply spindle structure. The protective film is separated from the liner material by the action of the inner and outer laminate stripping drums. The protective films conveyed by the inner laminate stripping drum into the laminating structure and the laminate liner material is conveyed by the outer laminate stripping drum to the roll received upon the laminate liner take-up spindle structure.

The protective film is received from the inner laminate stripping drum by a toothed drive wheel having a clutch mechanism coupled thereto. The clutch mechanism coupled to the toothed drive wheel derives its motive power from the motor mechanism. The toothed drive wheel is in close proximity to the inner laminate stripping drum such that the protective film may be transferred from the inner laminate stripping drum to the toothed drive wheel thereby becoming adhered to the liner material upon which the labels are disposed. The teeth of the drive wheel are arranged to engage the tractor feed holes formed in the protective film and the liner material upon which the labels are disposed.

A die-cutting drum is slidingly disposed within a second pair of parallel slots formed between the first and second frame plate structures. The die cutting drum is constrained to rotate in registration with the toothed drive wheel. The die-cutting drum has a plurality of blades disposed upon the surface thereof, the blades being arranged to cut only the protective film that is adhered to the liner material having the labels disposed thereon. The cuts in the protective film are in registration with the labels disposed upon the liner material and are offset a predetermined distance from the edge of the labels disposed upon the liner material. The protective film not covering the labels is separated from the liner material upon which the now laminated labels are disposed and is wound up upon the roll received upon the laminate waste take-up spindle structure. The die-cutting drum of the present invention is interchangeable with a plurality of die-cutting drums having blades arranged in a plurality of predetermined manners.

An inner label feed drum is slidingly disposed within a third pair of parallel slots formed between the first and second frame plate structures. The inner label feed drum has coupled thereto a clutch mechanism which derives motive power from the motor mechanism. The inner label feed drum is located immediately adjacent the toothed drive wheel so as to convey the liner material upon which the now laminated labels are disposed to the roll received upon the laminated label take-up spindle structure.

A first tensioning device is coupled to the inner and outer laminate stripping drums disposed within the first parallel slot formed between the first and second frame plate structures. A second tensioning device is coupled to the die-cutting drum disposed within the second parallel slot formed between the first and second frame plate structures. A third tensioning device is coupled to the inner label feed drum disposed within the third parallel slot formed between the first and second frame plates. Each of the three tensioning devices is capable of altering the tension placed upon the laminate liner material and the liner material upon which the labels are disposed by altering the linear location of the inner and outer laminate stripping drums, the die-cutting drum, and the inner label feed drum, respectively, within their respective parallel slots.

DESCRIPTION OF THE DRAWINGS

FIG. 2 is schematic showing a cross-section of an unlaminated label and the liner material that it is disposed on.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
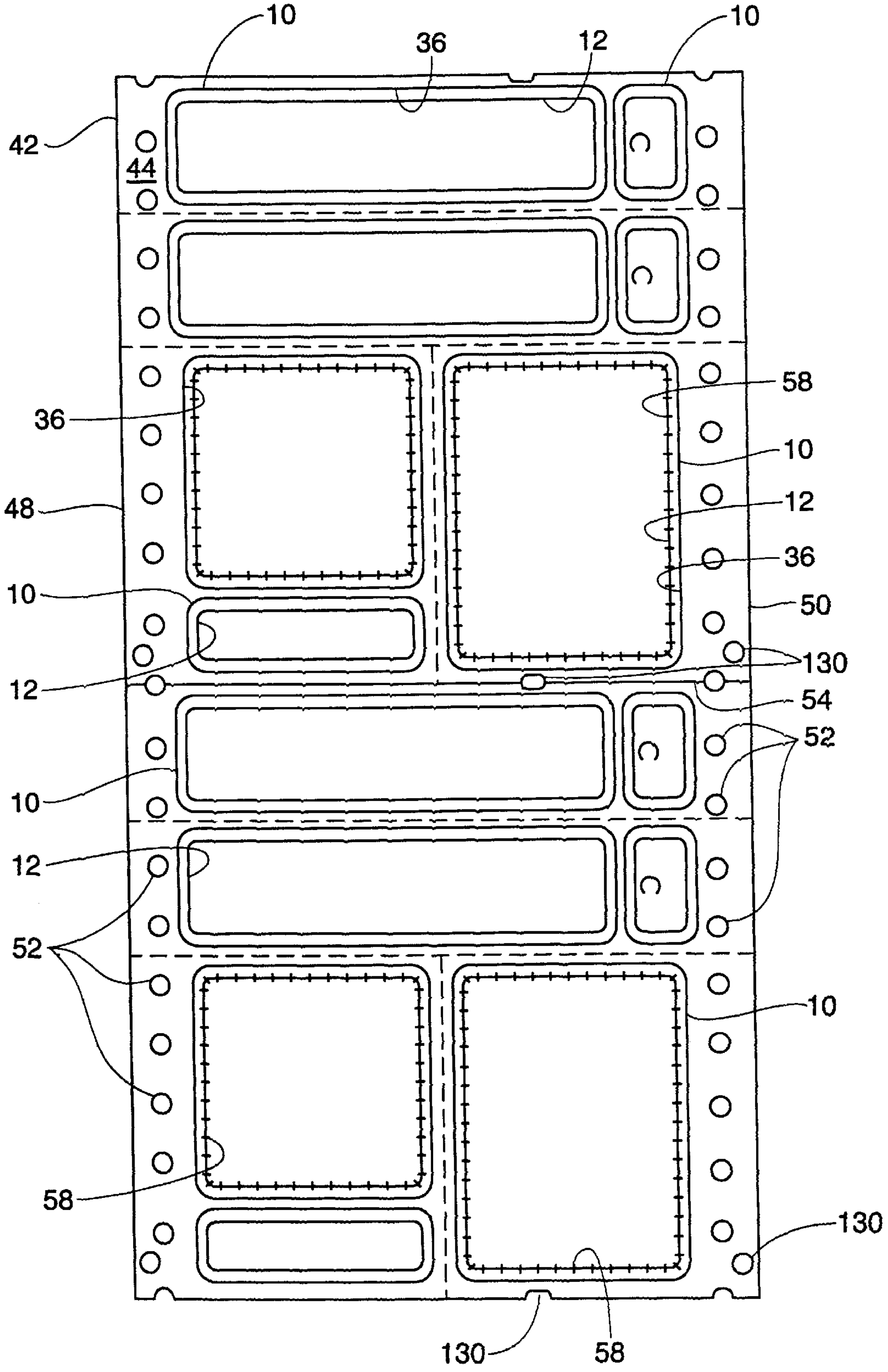
FIG. 1 is a plan view of a number of laminated labels disposed upon a portion of liner material.
Figure 4:
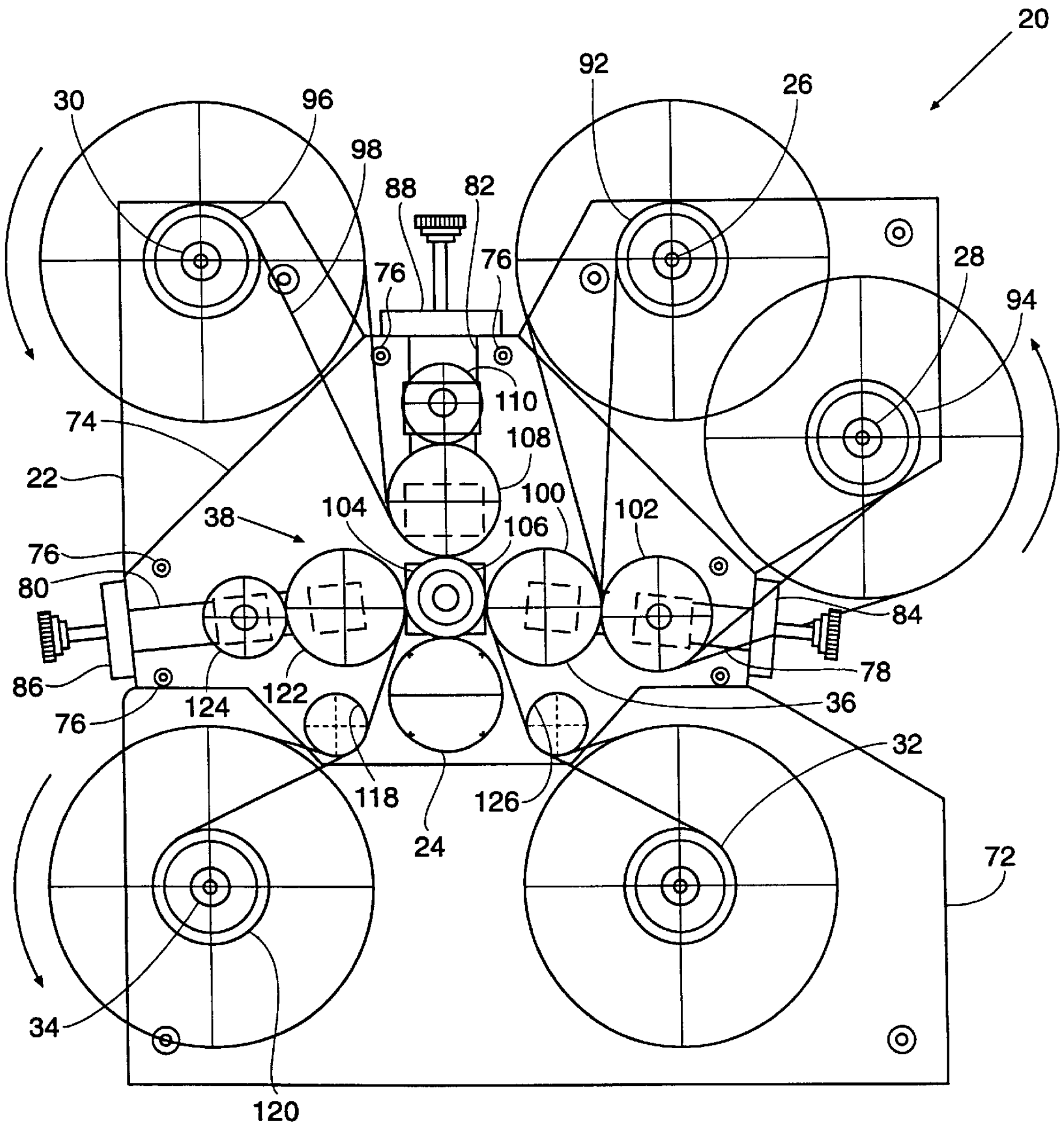
FIG. 4 is a front elevation of the laminating device.

Referring first to FIG. 1, the laminated labels 10 produced by the laminating device 20 are comprised of a label 12 covered by a layer of protective film 36, the label 12 and the protective film 36 both being disposed upon a liner 42. The laminating device 20 which produces the laminated labels 10 is illustrated in FIG. 4 and comprises a chassis 22 upon which are mounted a motor 24, a plurality of reel spindles 26, 28, 30, 32, 34, a laminating structure 38 for applying the protective film 36 to the labels 12, and a control means (not shown) for controlling the interaction of the reel spindles 26, 28, 30, 32, 34 with the laminating structure 38.

Both the unlaminated labels 12 and the protective film 36 are initially provided upon their own it respective liners 42. In the preferred embodiment of this invention the respective liners 42 used with both the labels 12 and the protective film 36 are identical in dimension. The liners 42 used with the present invention are in the form of a continuous strip of material that has at least one coated surface 44 upon which the labels 12 and the protective film 36 are disposed. The adhesive 46 of the labels 12 and the protective film 36 will adhere to the coated surface 44 of the liner 42 but will be easily and cleanly releasable therefrom, i.e. the adhesive bond between the adhesive 46 and the coated surface 44 of the liner 42 is significantly weaker than the adhesive bond between the adhesive 46 and the labels 12 or the protective film 36. It is to be understood that the adhesive used with the labels 12 and the protective film 36 may be the same adhesive, or, if an application so requires it, a different adhesive.

The liner 42, as drawn in FIG. 1, has parallel edges 48 and 50. Offset a predetermined distance from each of the parallel edges 48 and 50 of the liner 42 are a plurality of tractor feed holes 52. The tractor feed holes 52 are evenly spaced from one another and mate with a plurality of teeth 106 on a drive wheel 104 of the laminating structure 38. The tractor feed holes 52 permit the liner 42 of the labels 12 to be moved through the laminating structure 38 in a registered fashion.

The labels 12 that are to be laminated must be arranged upon their liner 42 in a repetitive pattern. Each repetition of the pattern may be separated from the previous and subsequent group of labels 12 by perforations 54 in the liner 42, though these perforations are optional. Two identical groups of laminated labels 10 separated by perforations 54 are depicted in FIG. 1. Printer registration holes 130 are formed between each group of labels 12, in this case, at the perforations 54. The printer registration holes 130 ensure that the printer (not shown) used to print information or designs upon the labels 12 will print the information or designs in the appropriate locations. The perforations 54 in the liner 42 allows the liner 42 underlying each group of labels 12 to be separated from the remaining labels 12 on the liner 42. It is to be understood that the perforations 54 can be formed in any location between the labels 12 that a user desires.

Figure 3:
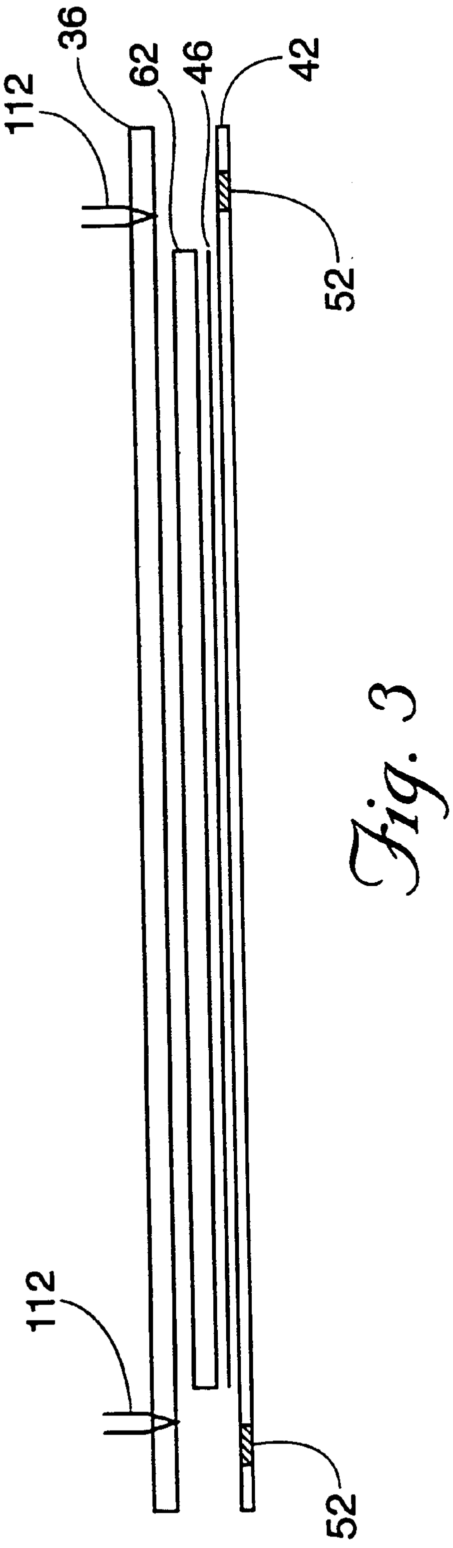
FIG. 3 is a schematic showing a cross-section of a laminated label.

FIGS. 1 and 3 illustrate the placement of individual sheets of laminate over the respective labels 12. A number of the labels 12 have security cuts 58 formed into their edges to prevent the labels 12 from being disturbed once applied. The security cuts 58 reduce the label's 12 ability to withstand tensile and shear forces. By dictating that the adhesive bond between the labels 12 and the site to which they are bonded is at least as great as the cohesive strength of the material from which the labels 12 are fashioned, the security cuts 58 ensure that the labels 10 or 12 win tear or otherwise be visibly marred if a person attempts to remove it from the surface to which it has been applied.

Figure 2:
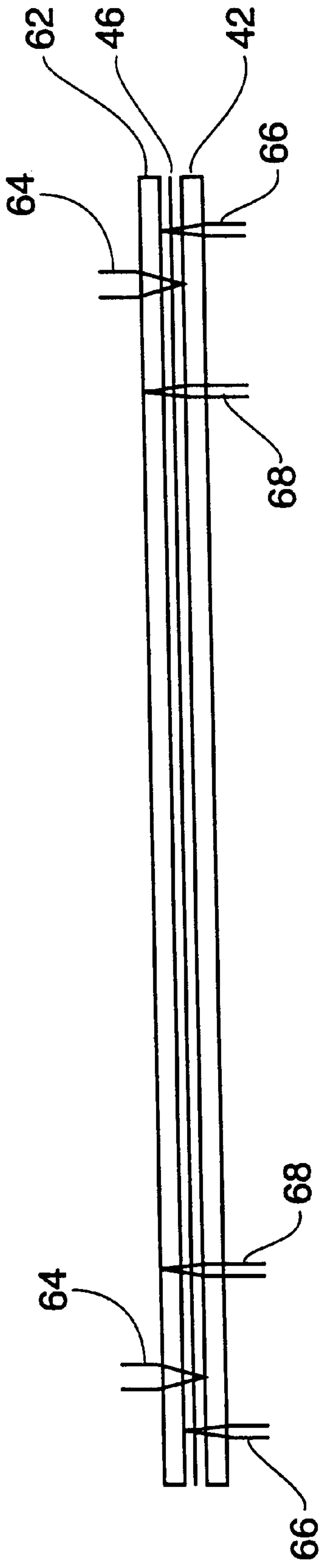

With reference to FIGS. 2 and 3, the labels 12 are fabricated using well-known devices and techniques that are not themselves part of the present invention. The most common method of fabricating the labels 12 involves a first step of applying the adhesive 46 to the first side of a continuous ribbon of label substrate material 62. The continuous ribbon of label substrate material 62 is then applied to a continuous ribbon of liner material 42. The resulting ribbon of label substrate 62 and liner 42 is fed through a stacked die cutting system (not shown) which cuts through the label substrate material 62 to define the perimeter of the label 12. Blades 64, which cut through the label substrate material 62 to define the perimeter of the label 12, are sized to only cut the label substrate material 62 without cutting into the liner 42. At essentially the same time, blades 66 and 68 cut the tractor feed holes 52 and the security cuts 58, respectively. Blades 66 and 68 are sized to cut through both the liner 42 and the label substrate material 62. Yet another set of blades (not shown) cut the perforations 54 through the liner 42. The label substrate material 62 between the perimeters of the newly cut labels 12 is stripped away. The liner 42 with the labels 12 disposed thereon is generally placed on a roll, though the liner 42 may also be folded along its perforations for storage.

The labels 12 are then printed. Though information or designs may be written or drawn upon the labels 12, it is preferred to print upon the labels 12 using well known laser printing, resin printing, or thermographic printing techniques. The printer registration holes 130 act in conjunction with sensors within the chosen printer (not shown) that prints information or designs upon the label 12 in order to ensure that the printing is made upon the individual labels 12 disposed upon the liner 42 in its intended locations.

The printed labels 12 disposed upon liner 42 are then loaded into the laminating device 20 for lamination. Though the preferred embodiment of the laminating device 20 describes using rolls of liner 42 with label portions 12, it is to be understood that the present invention can be modified to accept folded liners 42 without exceeding the scope of this description.

The chassis 22 of the laminating device 20 is comprised of a first frame plate 72 and a second frame plate 74. The chassis is supported by a stand (not shown) that is affixed to the first frame plate 72. The second frame plate 74 is secured to the first frame plate 72 in parallel relation to, and spaced apart from, the first frame plate 72 by spacers 76. The first and second frame plates 72 and 74 together form three pairs of parallel slots 78, 80, and 82. These pairs of parallel slots 78, 80, and 82 are sized to slidably receive tensioning structures 84, 86, and 88, respectively. The tensioning structures 84, 86, and 88 are themselves arranged to mount a plurality of rollers or drums.

The first frame plate 72 has mounted thereto a laminate supply spindle 26, a liner take up spindle 28, a laminate waste take-up spindle 30, a label supply spindle 32, and a laminated label take-up spindle 34. The spindles 26, 28, 30, 32, 34 cooperate to pass laminating material and printed labels through the laminating structure 38 for lamination. Further, the spindles 26, 28, 30, 32, 34 are all driven by respective clutch means (not shown) which couple the spindles 26, 28, 30, 32, 34 to a motor 24 that is mounted between the first and second frame plates 72 and 74. During the lamination process the clutch means engage in order to drive the spindles 26, 28, 30, 32, 34 so as to pass the protective film 36 and the labels 12 through the laminating structure 38.

A roll 92 of protective film 36 disposed upon a liner 42 is received upon the laminate supply spindle 26 such that the liner 42 with the protective film 36 may be unwound from the roll 92 when the laminate supply spindle 26 is rotated in a counterclockwise direction. A second roll 94 is received upon liner take-up spindle 28 in order to wind up the liner 42 after the protective film 36 has been removed therefrom in the laminating process. A third roll 96 is received upon the laminate waste take-up spindle 30 in order to wind up the protective film waste 98 that was not used in the laminating process. The laminating process is such that the waste laminate material 98 forms a strip that may be wound up on the roll 96 in a counter clockwise direction.

Inner laminate feed drum 100 and outer laminate feed drum 102 are rotatively mounted in a fixed relationship to one another upon tensioning structure 84 which itself is slidingly mounted within slot 78. The inner laminate feed drum 100 and outer laminate feed drum 102 are also connected to the motor 24 by respective clutch means (not shown) so that the drums 100 and 102 may be driven at a predetermined rate of rotation. The inner laminate feed drum 100 rotates in a counterclockwise direction and the outer laminate feed drum rotates in a clockwise direction. Furthermore, the inner and outer laminate feed drums 100 and 102 are in contact with one another such that when the respective drums 100 and 102 are driven, the laminate material on roll 92 may be drawn between the drums 100 and 102. As can be seen in FIG. 4, the liner 42 is separated from the protective film 36 once the film 36 and liner 42 have been drawn through the drums 100 and 102. The liner 42 from the protective film 36 is then wound up on roll 94 that is mounted upon liner take-up spindle 28. The protective film 36 is passed around the inner laminate feed drum 100 in a clockwise direction to the point where the inner laminate feed drum 100 meets the toothed drive wheel 104 and the tractor feed holes 52 of the protective film 36 are engaged by the teeth 106 of the drive wheel 104.

Label supply spindle 32 has mounted thereon a roll of labels 12 disposed upon a liner 42. The liner 42 having the labels disposed thereon has tractor feed holes 52 formed into its edges that are in registration with the printed labels 12. The liner 42 having the labels 12 disposed thereon is unwound from the label supply spindle 32 in a counterclockwise direction and passes around a first idler 126 before the tractor feed holes 52 of the liner material 42 are engaged by the teeth 106 of the drive wheel 104. At the point of contact between the inner laminate feed drum 100 and the toothed drive wheel 104, the protective film 36 and the liner material 42 having the printed labels 12 disposed thereon are brought into adhesive contact. At this stage the protective film 36 covers the entire surface area of the liner 42 upon which the labels 12 are disposed. The liner 42 having the labels 12 covered by the protective film 36 is then rotated counterclockwise around the toothed drive wheel 104 into contact with the die cutting drum 108.

The die cutting drum 108 and second idler 110 are rotatively mounted within tensioning structure 88 which is itself slidably mounted within slot 82 between first and second frame plates 72 and 74. The second idler 110 is in contact with the die cutting drum 108 and is free running so that it can move in response to the die cutting drum 108. The die cutting drum 108 is constrained to rotate in strict registration with the toothed drive wheel 104. The means of connecting the drive wheel 104 to the die cutting drum 108 may comprise a set of gears or a toothed belt and sheaves (not shown). The die cutting drum 108 has disposed upon its surface a plurality of laminate cutting blades or knives 112 (seen in FIG. 3) that are sized so as to cut through the only the protective film 36 when the knives 112 are brought into contact with the liner 42 having the protective film 36 adhered thereto. As the arrangement of the printed labels 12 upon the liner material 42 may vary from application to application, so too will the arrangement of the knives 112 upon the surface of the die-cutting drum 108. Each arrangement of printed labels 12 upon the liner material 42 will require a complementary die cutting drum 108. It is intended that the die-cutting drum 108 be easily removable from the tensioning structure 88 so that it may be altered or replaced should a new cutting arrangement be needed. The laminate cutting blades 112 are arranged upon the surface of the die cutting drum 108 such that the cuts made by the knives 112 are in registration with the printed labels 12 disposed upon the liner 42. In the preferred embodiment of the present invention the laminate cutting blades 112 of the die cutting drum 108 cut the protective film 36 at an offset to the perimeter of the printed labels 12 of approximately 0.1 inches. This dimension permits the protective film 36 to extend beyond the security cuts 58 formed into the perimeter of the printed labels 12. It must be understood that the precise dimension of the offset between the perimeters of the protective film 36 and the printed label 12 may be altered to meet the needs of the user, provided that the protective film 36 is cut to a dimension at least as large as the printed label 12.

As the liner material 42 passes from between the toothed drive wheel 104 and the knives 112 of the die cutting drum 108, that portion of the protective film 36 not adhered directly to a printed label 12 is wound up by roll 96 received upon laminate waste take-up spindle 30. The liner 42 having the now laminated labels 10 disposed thereon next passes between an inner label feed drum 122 and the toothed drive wheel 104 before passing around a third idler 118 to be wound up on the laminated label take up roll 120 received upon laminated label take-up spindle 34.

Inner label feed drum 122 and outer label feed drum 124 are rotatively mounted in a fixed relationship to one another upon tensioning structure 86 which itself is slidingly mounted within slot 80. The inner label feed drum 122 and outer label feed drum 124 are also connected to the motor 24 by respective clutch means (not shown) so that the drums 122 and 124 may be driven at some predetermined rate of rotation. The inner label feed drum 122 rotates in a clockwise direction and the outer label feed drum 124 rotates in a counterclockwise direction.

An electronic control means (not shown) is electrically coupled to the clutch means that are physically coupled to the spindles 26, 28, 30, 32, 34 and to the inner laminate feed drum 100, outer laminate feed drum 102, toothed drive wheel 104, die cutting drum 108, idler 110, inner label feed drum 122, and outer label feed drum 124. The control means also controls the motor 24. In order to prevent the breakage of the liners 42 or the protective film 36, it is important to operate the spindles 26, 28, 30, 32, 34, inner laminate feed drum 100, outer laminate feed drum 102, toothed drive wheel 104, die cutting drum 108, idler 110, inner label feed drum 122, and outer label feed drum 124 at the same linear speeds. Where the elements of the laminating device 20 are not in synchronization with regard to the linear speed of the liners 42 and the protective film 36, it is likely that the liners 42 or protective film 36 will be stretched, torn, or bunched up at the point where the velocity changes. Where the protective film is torn or stretched, the lamination is more likely to fail to prevent the label 12 from being damaged by oil or other chemicals. Where the protective film 36 or the liner 42 bunch up, it is also likely that the laminating device will become jammed and therefore inoperable until the bunched material is cleared. The control means electronically coordinates between the plurality of the clutch means in order to ensure that the linear speed of the liners 42 and the protective film 36 is consistent.

The control means also comprises a counting means (not shown) that is capable of keeping track of each label 12 that is laminated by the laminating device 20. The counting means is preferably a counter that keeps track of the number of rotations of the die-cutting drum 108 and multiplies the number of rotations by the number of labels 12 that are laminated in each rotation of the drum 108. Another suitable counter may utilize the printer registration holes 130 to keep track of the number of labels that have passed a certain point in the laminating device 20.

The laminating device 20 is capable of laminating more than 500 labels per minute. At this rate the labels 12 upon the label supply spindle 32 are quickly laminated, requiring that a new roll of labels 12 and protective film 36 be spliced onto the existing liner 42 upon which the labels 12 and film 36 are disposed. Likewise, rolls received upon the liner take up spindle 28, the laminate waste take-up spindle 30 and the laminated label take-up spindle 34 must occasionally be changed. Initial set up of the laminating device 20 is accomplished by manually threading the respective liners 42 of the protective film 36 and the labels 12 through the laminating structure. Because the initial set up is time consuming and can represent a significant amount of down time, it is preferred to splice new rolls of protective film 36 and labels 12 onto the exhausted rolls before all of the liners of the film 36 and the labels 12 have been drawn through the laminating structure 38. A splicing aid (not shown) comprises a flat surface having disposed thereon a plurality of pins that mate with the tractor feed holes of the new and old liners 42. Typically, tape is used to connect the old and new liners 42 once they have been aligned.

The foregoing is considered as illustrative only of the principles of the invention. Furthermore, since numerous modifications and changes will readily. occur to those skilled in the art, it is not desired to limit the invention to the exact construction and operation shown and described. While the preferred embodiment has been described, the details may be changed without departing from the invention, which is defined by the claims.

What is claimed is:

1. A device for laminating one or more labels, the labels being disposed on a continuous strip of a liner material in a predetermined arrangement, the strip of liner material having parallel edges provided with a plurality of tractor feed holes arranged in registration with the predetermined arrangement of the labels disposed upon the liner material, the device for laminating the labels comprising:

a motor mechanism mounted between a first frame plate structure and a second frame plate structure, so that the first and second frame plate structures are spatially oriented in a substantially parallel planar relation to one another;

a label supply spindle structure and a label take-up spindle structure mounted upon the first frame plate, the label supply spindle structure arranged to receive a roll of unlaminated labels and the label take-up spindle structure arranged to receive a roll for winding up the labels once they have been laminated, the label supply and take-up spindle structures each having coupled thereto a clutch mechanism for driving the respective spindle structures, the respective clutch mechanism deriving motive power from a motor mechanism;

a laminate supply spindle structure, a laminate liner take-up spindle structure and a laminate waste take-up spindle structure mounted upon the first frame plate, the laminate supply spindle structure arranged to receive a roll of a protective film disposed upon a continuous strip of a laminate liner material, the protective film and the laminate liner material having tractor feed holes formed therein, the laminate liner take-up spindle structure arranged to receive a roll for winding up the strip of laminate liner material after the protective film has been removed therefrom, the laminate waste take-up spindle structure arranged to receive a roll for winding up the protective film not used in laminating the labels, the laminate supply spindle structure, laminate liner take-up spindle structure, and laminate waste take-up spindle structure each having coupled thereto a respective clutch mechanism, the clutch mechanism coupled to the laminate supply, laminate liner, and laminate waste take-up spindle structures deriving motive power from the motor mechanism;

a laminating structure mounted between the first frame plate and the second frame plate, the laminating structure operating to apply the protective film to labels in registration with the predetermined arrangement of the labels upon the liner material, the laminating structure also being powered by the motor mechanism via a plurality of clutch mechanisms; and a control means for controlling the clutch mechanisms and motor mechanism and the spindle structures and laminating structure cooperating therewith in the lamination of the labels.

2. The device for laminating labels of claim 1 wherein the laminating structure comprises:

an inner laminate stripping drum and an outer laminate stripping drum, the inner and outer laminate stripping drums slidingly disposed within a first pair of parallel slots formed between the first and second frame plate structures such that the inner and outer laminate stripping drums are in contact with one another, the inner and outer laminate stripping drums having respective clutch mechanism coupled thereto for driving the inner and outer laminate stripping drums, the respective clutch mechanism deriving motive power from the motor mechanism structure, the inner and outer laminate stripping drums also cooperating to draw the strip of protective film from the roll received upon the laminate supply spindle structure, the protective film being thereby separated from the liner material, the protective film being conveyed by the inner laminate stripping drum into the laminating structure, the laminate liner material being conveyed by the outer laminate stripping drum to the roll received upon the laminate liner take-up spindle structure;

a toothed drive wheel having a toothed drive wheel clutch mechanism coupled to said toothed drive wheel, the toothed drive wheel clutch mechanism deriving motive power from the motor mechanism, the teeth of the drive wheel being arranged to engage the tractor feed holes formed in the liner material upon which the labels are disposed and the protective film, the toothed drive wheel being in proximity to the inner laminate stripping drum such that the protective film may be transferred from the inner laminate stripping drum to the toothed drive wheel thereby becoming adhered to the liner material upon which the labels are disposed;

a die-cutting drum slidingly disposed within a second pair of parallel slots formed between the first and second frame plate structures, the die cutting drum being constrained to rotate in registration with the toothed drive wheel, the die-cutting drum having a plurality of blades disposed upon the surface thereof, the blades being arranged to cut only the protective film that is adhered to the liner material having the labels disposed thereon, the cuts in the protective film being in registration with the labels disposed upon the liner material, the cuts in the protective film being offset a predetermined distance from the edge of the labels disposed upon the liner material, the protective film not covering the labels being separated from the liner material upon which the now laminated labels are disposed and being wound up upon the roll received upon the laminate waste take-up spindle structure; and an inner label feed drum slidingly disposed within a third pair of parallel slots formed between the first and second frame plate structures, the inner label feed drum having coupled thereto a clutch mechanism, the clutch mechanism deriving motive power from the motor mechanism, the inner label feed drum being located immediately adjacent the toothed drive wheel so as to convey the liner material upon which the now laminated labels are disposed to the roll received upon the laminated label take-up spindle structure.

3. The laminating device of claim 2 wherein the laminating structure further comprises a first tensioning device coupled to the inner and outer laminate stripping drums disposed within the first parallel slot formed between the first and second frame plate structures, a second tensioning device coupled to the die-cutting drum disposed within the second parallel slot formed between the first and second frame plate structures, and a third tensioning device coupled to the inner label feed drum disposed within the third parallel slot formed between the first and second frame plate structures, the respective tensioning devices being capable of altering the tension placed upon the laminate liner material and the liner material upon which the labels are disposed by altering the linear location of the inner and outer laminate stripping drums, the die-cutting drum, and the inner label feed drum, respectively, within their respective parallel slots.

4. The laminating device of claim 2 wherein the die-cutting drum is interchangeable with a plurality of die-cutting drums having blades arranged in a plurality of predetermined manners.

5. A device for laminating at least one label, the label being disposed on a continuous strip of a liner material, the strip of liner material having parallel edges, the device for laminating the labels comprising:

a motor mechanism;

a label supply spindle structure and a label take-up spindle structure, the label supply spindle structure arranged to receive a roll of unlaminated labels and the label take-up spindle structure arranged to receive a roll for winding up the labels once they have been laminated, the label supply and take-up spindle structures each having coupled thereto a clutch mechanism for driving the respective spindle structures, the respective clutch mechanism deriving motive power from a motor mechanism;

a laminate supply spindle structure, a laminate liner take-up spindle structure and a laminate waste take-up spindle structure, the laminate supply spindle structure arranged to receive a roll of a protective film disposed upon a continuous strip of a laminate liner material, the laminate liner take-up spindle structure arranged to receive a roll for winding up the strip of laminate liner material after the protective film has been removed therefrom, the laminate waste take-up spindle structure arranged to receive a roll for winding up the protective film not used in laminating the labels, the laminate supply spindle structure, laminate liner take-up spindle structure, and laminate waste take-up spindle structure each having coupled thereto a respective clutch mechanism, the clutch mechanism coupled to the laminate supply, laminate liner, and laminate waste take-up spindle structures deriving motive power from the motor mechanism;

a laminating structure, the laminating structure operating to apply the protective film to labels in registration with the predetermined arrangement of the labels upon the liner material, the laminating structure also being powered by the motor mechanism via a plurality of clutch mechanisms; and a control means for controlling the clutch mechanisms and motor mechanism and the spindle structures and laminating structure cooperating therewith in the lamination of the labels.

6. A device for laminating one or more labels comprising:

a motor mechanism;

a label supply spindle structure and a label take-up spindle structure, the label supply and take-up spindle structures each having coupled thereto a clutch mechanism for driving the respective spindle structures, the respective clutch mechanism deriving motive power from said motor mechanism;

a laminate supply spindle structure having a laminate supply spindle clutch coupled thereto for driving said laminate supply spindle structure, the laminate supply spindle clutch deriving motive power from said motor mechanism;

a laminate liner take-up spindle structure having a laminate liner take-up spindle clutch coupled thereto for driving said laminate liner take-up spindle structure, the laminate liner take-up spindle clutch deriving motive power from said motor mechanism;

a laminate waste take-up spindle structure having a laminate waste take-up spindle clutch coupled thereto for driving said laminate waste take-up spindle structure, the laminate waste take-up spindle clutch deriving motive power from said motor mechanism;

a laminating structure, the laminating structure being powered by the motor mechanism by way of a plurality of clutch mechanisms; and a control means for controlling the clutch mechanisms and motor mechanism and the spindle structures and laminating structure.

* * * * *

UNITED STATES PATENT AND TRADEMARK OFFICE

CERTIFICATE OF CORRECTION

PATENT NO. : 6,401,782 B1 
DATED : June 11, 2002
INVENTOR(S) : Beaudry, Wallace J.

It is certified that error appears in the above-identified patent and that said Letters Patent is hereby corrected as shown below:

<u>Column 2,</u>
Line 23, delete “a, label” and substitute -- a label --
Line 32, delete “derives its” and substitute -- derive --

<u>Column 7,</u>
Line 24, delete “the protective” and substitute -- protective --

<u>Column 9,</u>
Line 23, delete “a motor” and substitute -- the motor --

<u>Column 11,</u>
Line 18, delete “a motor” and substitute -- the motor --

Signed and Sealed this

Sixteenth Day of September, 2003

JAMES E. ROGAN
*Director of the United States Patent and Trademark Office*